(12) United States Patent
Lyman et al.

(10) Patent No.: US 10,657,483 B2
(45) Date of Patent: May 19, 2020

(54) SYSTEMS AND METHODS FOR SECURE PACKAGE DELIVERY

(71) Applicant: Vivint, Inc., Provo, UT (US)

(72) Inventors: Jefferson Lyman, Alpine, UT (US); Brandon Hatch, Provo, UT (US)

(73) Assignee: Vivint, Inc., Provo, UT (US)

( * ) Notice: Subject to any disclaimer, the term of this patent is extended or adjusted under 35 U.S.C. 154(b) by 703 days.

(21) Appl. No.: 14/264,728

(22) Filed: Apr. 29, 2014

(65) Prior Publication Data

US 2015/0310381 A1 Oct. 29, 2015

(51) Int. Cl.
*G06Q 10/08* (2012.01)

(52) U.S. Cl.
CPC .................... *G06Q 10/083* (2013.01)

(58) Field of Classification Search
CPC ................................................. G06Q 10/083
See application file for complete search history.

(56) References Cited

U.S. PATENT DOCUMENTS

| | | | | |
|---|---|---|---|---|
| 5,865,368 | A * | 2/1999 | Taylor | A47G 29/121 232/35 |
| 6,138,910 | A * | 10/2000 | Madruga | A47G 29/22 235/383 |
| 6,323,782 | B1 * | 11/2001 | Stephens | G07C 9/00103 340/10.31 |
| 6,476,858 | B1 | 11/2002 | Ramirez et al. | |
| 6,570,488 | B2 | 5/2003 | Kucharczyk et al. | |
| 6,696,918 | B2 * | 2/2004 | Kucharczyk | A47G 29/141 340/5.21 |
| 6,725,127 | B2 * | 4/2004 | Stevens | A47G 29/141 232/20 |
| 6,862,576 | B1 | 3/2005 | Turner et al. | |
| 6,879,836 | B2 * | 4/2005 | Nakamoto | G01C 21/20 340/991 |
| 7,158,941 | B1 * | 1/2007 | Thompson | G06Q 10/08 232/19 |
| 7,518,485 | B2 | 4/2009 | Shuster | |
| 7,653,603 | B1 * | 1/2010 | Holtkamp, Jr. | A47G 29/141 705/50 |

(Continued)

FOREIGN PATENT DOCUMENTS

| | | |
|---|---|---|
| JP | 2011-077835 | 4/2011 |
| KR | 10-2001-0016412 | 3/2001 |

(Continued)

OTHER PUBLICATIONS

Vast-Binder Jr., John Phillip, Mailman: Studies of Urban Letter Carriers, Northwestern University, Evanston, Illinois, Aug. 1973.*

(Continued)

*Primary Examiner* — Nathan Erb
(74) *Attorney, Agent, or Firm* — Holland & Hart, LLP

(57) ABSTRACT

A computer-implemented method for enabling secure delivery of a package to a designated delivery area of a premises is described. In one embodiment, information regarding a delivery of a package to a premises may be received, a delivery person arriving at the premises may be detected, and instructions may be provided to the delivery person regarding how to deliver the package to the designated delivery area within the premises.

20 Claims, 6 Drawing Sheets

(56) References Cited

U.S. PATENT DOCUMENTS

| | | | | |
|---|---|---|---|---|
| RE43,178 E | * | 2/2012 | Ghazarian | G06Q 10/08 340/568.1 |
| 8,261,976 B1 | * | 9/2012 | Block | G06Q 20/18 235/379 |
| 8,493,193 B2 | * | 7/2013 | Louis | E05B 81/06 340/425.5 |
| 9,161,164 B2 | * | 10/2015 | Proctor, Jr. | H04W 4/029 |
| 9,418,495 B2 | * | 8/2016 | Mackin | G07C 9/00023 |
| 9,437,063 B2 | | 9/2016 | Schoenfelder et al. | |
| 9,449,317 B2 | | 9/2016 | Reblin | |
| 9,536,359 B1 | * | 1/2017 | Gokcebay | E05B 47/06 |
| 9,626,857 B2 | | 4/2017 | Fokkelman | |
| 9,721,147 B1 | * | 8/2017 | Kapczynski | G06Q 50/265 |
| 2001/0045180 A1 | * | 11/2001 | McCormick | A47G 29/10 109/53 |
| 2001/0050615 A1 | | 12/2001 | Kucharczyk et al. | |
| 2001/0051877 A1 | | 12/2001 | Steval | |
| 2002/0027981 A1 | * | 3/2002 | Bedrosian | G01C 21/362 379/201.08 |
| 2002/0035515 A1 | | 3/2002 | Moreno | |
| 2002/0067261 A1 | | 6/2002 | Kucharczyk et al. | |
| 2002/0087429 A1 | * | 7/2002 | Shuster | G07F 17/12 340/5.73 |
| 2002/0112174 A1 | | 8/2002 | Yager et al. | |
| 2002/0113703 A1 | * | 8/2002 | Moskowitz | A47G 29/141 340/568.1 |
| 2002/0138759 A1 | * | 9/2002 | Dutta | H04L 63/0442 726/30 |
| 2002/0147919 A1 | * | 10/2002 | Gentry | A47G 29/141 726/2 |
| 2002/0156645 A1 | * | 10/2002 | Hansen | G06Q 10/08 705/333 |
| 2002/0178074 A1 | * | 11/2002 | Bloom | G06Q 10/08 705/26.81 |
| 2002/0180582 A1 | | 12/2002 | Nielsen | |
| 2003/0004889 A1 | | 1/2003 | Fiala et al. | |
| 2003/0006275 A1 | * | 1/2003 | Gray | A47G 29/14 232/19 |
| 2003/0022676 A1 | * | 1/2003 | Nakamoto | G01C 21/20 455/456.1 |
| 2003/0023870 A1 | * | 1/2003 | Geros | A47G 29/141 726/27 |
| 2003/0037009 A1 | * | 2/2003 | Tobin | G06Q 10/08 705/65 |
| 2003/0050732 A1 | * | 3/2003 | Rivalto | G06Q 10/08 700/237 |
| 2003/0135432 A1 | * | 7/2003 | McIntyre | G06Q 10/087 705/28 |
| 2003/0195814 A1 | * | 10/2003 | Striemer | G06Q 30/02 705/26.8 |
| 2004/0149823 A1 | * | 8/2004 | Aptekar | G06Q 10/08 235/385 |
| 2004/0172403 A1 | * | 9/2004 | Steele | G07C 9/00 |
| 2004/0185842 A1 | * | 9/2004 | Spaur | B60R 25/04 455/420 |
| 2004/0243430 A1 | * | 12/2004 | Horstemeyer | B60R 25/102 340/928 |
| 2004/0252017 A1 | | 12/2004 | Holding et al. | |
| 2005/0061877 A1 | * | 3/2005 | Stevens | A47G 29/141 235/385 |
| 2005/0068178 A1 | * | 3/2005 | Lee | G06Q 10/08 340/569 |
| 2005/0088281 A1 | * | 4/2005 | Rohrberg | G07C 9/00182 340/5.71 |
| 2005/0131774 A1 | | 6/2005 | Huxter | |
| 2005/0187836 A1 | * | 8/2005 | Wolfe | G06Q 10/08 705/28 |
| 2006/0108419 A1 | | 5/2006 | Som | |
| 2006/0122852 A1 | | 6/2006 | Moudy | |
| 2007/0005452 A1 | * | 1/2007 | Klingenberg | G06Q 10/08 705/334 |
| 2007/0024421 A1 | * | 2/2007 | Hale | G07C 9/00309 340/5.73 |
| 2007/0052586 A1 | * | 3/2007 | Horstemeyer | G06Q 10/06311 342/457 |
| 2007/0150375 A1 | * | 6/2007 | Yang | G06Q 10/08 705/339 |
| 2007/0193834 A1 | * | 8/2007 | Pai | G06Q 10/08 186/3 |
| 2007/0285227 A1 | * | 12/2007 | Timothy | G06F 1/1626 340/539.13 |
| 2008/0121682 A1 | * | 5/2008 | Grim | A47G 29/141 232/1 R |
| 2008/0252723 A1 | | 10/2008 | Park | |
| 2009/0179735 A1 | * | 7/2009 | Van Rysselberghe | A47G 29/141 340/5.73 |
| 2009/0298491 A1 | * | 12/2009 | Kadaba | G06Q 10/10 455/419 |
| 2010/0059587 A1 | * | 3/2010 | Miller | G06Q 20/1085 235/379 |
| 2010/0241564 A1 | * | 9/2010 | Miller | G06Q 20/1085 705/43 |
| 2010/0303307 A1 | * | 12/2010 | Rothschild | H04L 63/0861 382/116 |
| 2011/0238574 A1 | * | 9/2011 | Miller | G06Q 20/1085 705/43 |
| 2011/0276510 A1 | * | 11/2011 | Turbeville | G06Q 10/08 705/330 |
| 2011/0316683 A1 | * | 12/2011 | Louis | E05L 381/06 340/426.28 |
| 2012/0030124 A1 | * | 2/2012 | Cronkright, II | G06Q 10/06 705/316 |
| 2012/0030133 A1 | * | 2/2012 | Rademaker | G06Q 10/08 705/333 |
| 2012/0044050 A1 | * | 2/2012 | Vig | G07C 9/00158 340/5.82 |
| 2012/0169453 A1 | | 7/2012 | Bryla et al. | |
| 2012/0223133 A1 | * | 9/2012 | Miller | G06Q 20/1085 235/379 |
| 2012/0226622 A1 | * | 9/2012 | Gonzalez | G06F 16/9535 705/319 |
| 2012/0233085 A1 | * | 9/2012 | Zimberoff | G06Q 10/083 705/330 |
| 2012/0249328 A1 | * | 10/2012 | Xiong | G10L 15/22 340/541 |
| 2013/0010144 A1 | | 1/2013 | Park | |
| 2013/0017812 A1 | * | 1/2013 | Foster | H04L 12/2825 455/417 |
| 2013/0027552 A1 | | 1/2013 | Guzik | |
| 2013/0261792 A1 | * | 10/2013 | Gupta | G06Q 10/08 700/232 |
| 2013/0311365 A1 | * | 11/2013 | Miller | G06Q 20/1085 705/43 |
| 2014/0046842 A1 | * | 2/2014 | Irudayam | G07F 19/202 705/43 |
| 2014/0156472 A1 | * | 6/2014 | Stuntebeck | G06Q 10/087 705/28 |
| 2014/0195626 A1 | * | 7/2014 | Ruff | H04L 63/104 709/206 |
| 2014/0221012 A1 | * | 8/2014 | Uetabira | H04W 4/029 455/456.3 |
| 2014/0257691 A1 | * | 9/2014 | Siris | G01S 19/07 701/482 |
| 2014/0266669 A1 | * | 9/2014 | Fadell | G05B 19/042 340/501 |
| 2014/0279596 A1 | * | 9/2014 | Waris | G06Q 10/083 705/317 |
| 2014/0279666 A1 | * | 9/2014 | Lievens | G06Q 10/02 705/339 |
| 2014/0317005 A1 | * | 10/2014 | Balwani | G06Q 10/0832 705/317 |
| 2014/0334684 A1 | | 11/2014 | Strimling | |
| 2014/0351125 A1 | * | 11/2014 | Miller | G06Q 20/1085 705/43 |
| 2015/0123766 A1 | * | 5/2015 | St. John | G07C 9/00071 340/5.84 |

(56) References Cited

U.S. PATENT DOCUMENTS

| | | |
|---|---|---|
| 2015/0142594 A1 | 5/2015 | Lutnick et al. |
| 2015/0143461 A1* | 5/2015 | Uetabira ............... H04W 4/029 726/3 |
| 2015/0186869 A1 | 7/2015 | Winters et al. |
| 2015/0194000 A1 | 7/2015 | Schoenfelder et al. |
| 2015/0199673 A1 | 7/2015 | Savolainen et al. |
| 2015/0199857 A1 | 7/2015 | Mackin et al. |
| 2015/0221151 A1* | 8/2015 | Bacco ................ G07C 9/00087 340/5.83 |
| 2015/0261956 A1* | 9/2015 | Anderson ............... G06F 21/57 726/22 |
| 2015/0310443 A1* | 10/2015 | Thomasson ........ G06Q 30/0619 705/44 |
| 2016/0027093 A1 | 1/2016 | Crebier |
| 2016/0088287 A1* | 3/2016 | Sadi ....................... H04N 19/54 348/43 |
| 2016/0142644 A1* | 5/2016 | Lin .................... H04N 5/23238 348/143 |
| 2016/0171435 A1* | 6/2016 | Newton ............. G06Q 10/0833 705/333 |
| 2016/0185503 A1* | 6/2016 | Balwani ............. G06Q 10/0832 220/592.01 |
| 2016/0259928 A1* | 9/2016 | Donenfeld ............... G06F 21/32 |
| 2016/0301674 A1* | 10/2016 | Uetabira ............... H04W 4/029 |
| 2017/0109950 A1* | 4/2017 | Bacco ................ G07C 9/00087 |
| 2017/0149758 A1* | 5/2017 | Uetabira ............... H04W 4/029 |
| 2017/0213033 A1* | 7/2017 | Anderson ............... G06F 21/57 |
| 2017/0236101 A1* | 8/2017 | Irudayam ............. G07F 19/202 382/140 |
| 2017/0372321 A1* | 12/2017 | Weiss ...................... G06F 21/32 |
| 2018/0151013 A1* | 5/2018 | Carstens ............. A47G 29/141 |
| 2018/0232976 A1 | 8/2018 | Schoenfelder et al. |
| 2018/0322289 A1* | 11/2018 | Anderson ............... G06F 21/57 |
| 2019/0114853 A1 | 4/2019 | Schoenfelder et al. |

FOREIGN PATENT DOCUMENTS

| | | |
|---|---|---|
| KR | 10-2006-0111749 | 10/2006 |
| KR | 10-2013-0082790 | 7/2013 |
| WO | 2007098217 A2 | 8/2007 |

OTHER PUBLICATIONS

International Search Report and Written Opinion of the International Searching Authority for PCT/US2015/026930, dated Jul. 28, 2015.
English machine translation of KR 10-2006-0111749. Oct. 30, 2006.
English machine translation of JP 2011-077835. Apr. 14, 2011.
English machine translation of KR 10-2001-0016412. Mar. 5, 2001.
English machine translation of KR 10-2013-0082790. Jul. 22, 2013.
Guo, H. et al., "Joint Video Stitching and Stabilization from Moving Cameras", IEEE Transactions on Image Processing, vol. 25, No. 11, Nov. 2016, pp. 5491-5503.
Jiang, W. et al., "Video Stitching with Spatial-Temporal Content-Preserving Warping", Computer Vision and Pattern Recognition Workshops (CVPRW), 2015 IEEE Conference on Date of Conference: Jun. 7-12, 2015 Date Added to IEEE Xplore: Oct. 26, 2015, Electronic ISSN: 2160-7516 Inspec Accession No. 15554203 DOI: 10.1109/CVPRW.2015.7301374.
Rieffel, E. G. et al., "Geometric Tools for Multicamera Surveillance Systems", Distributed Smart Cameras, 2007, ICDSC '07, First ACM/IEEE International.Conference on Date of Conference: Sep. 25-28, 2007, FX Palo Alto Laboratory, Palo Alto, CA, Oct. 22, 2007, 8 pp.
Extended European Search Report for EP Application No. 15786776.3, dated Aug. 9, 2017 (7 pp.).
PCT International Search Report for International Application No. PCT/US2018/030240, dated Aug. 14, 2018 (3 pp.).

* cited by examiner

SYSTEMS AND METHODS FOR SECURE PACKAGE DELIVERY

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of premises automation and home security products. Advancements in mobile devices allow users to monitor a home or business. Information related to secure package delivery, however, is not always readily available. As a result, benefits may be realized by providing systems and methods for secure package delivery in relation to premises automation systems.

SUMMARY

According to at least one embodiment, a computer-implemented method for enabling secure delivery of a package to a designated delivery area of a premises is described. In one embodiment, information regarding a delivery of a package to a premises may be received, a delivery person arriving at the premises may be detected, and instructions may be provided to the delivery person regarding how to deliver the package to the designated delivery area within the premises.

In one embodiment, upon verifying information associated with the delivery person (e.g., identity, temporary access code, etc.), the delivery person may be granted access to the delivery area. Additionally, or alternatively, upon verifying that at least one monitored locking mechanism of the premises is in a locked position, the delivery person may be granted access to the delivery area. At least one image (e.g., photos and/or video) may be captured of the delivery person in the delivery area placing the package at the designated delivery location.

In some embodiments, one or more photo and/or video images of the delivery area may be captured and image analysis may be performed on one or more captured images to enable the identification of a designated delivery location within the designated delivery area by detecting an indicator of the designated delivery location. In one embodiment, an occupant of the premises may be requested to select a delivery area and to specify a location within the delivery area where the package is to be placed by the delivery person. In some embodiment, a captured image may be analyzed to determine whether access to the designated delivery location is obstructed. Upon determining access to the designated delivery location is obstructed, a notification may be generated, the notification including information regarding the detected obstruction.

In some embodiments, a location of an occupant of the premises may be determined. Upon determining the location of the occupant is beyond a predefined distance of the premises, a type of delivery may be automatically selected. The type of delivery may specify a location at the premises where the package is to be placed by the delivery person. Upon determining the location of the occupant is within a predefined distance of the premises, the occupant may select a type of delivery.

Upon determining the package is delivered securely, a delivery notification may be sent. The delivery notification may include at least one element of information regarding the delivery of the package, one or more images of the delivered package (photo and/or video), and/or a system security overview. Upon detecting the occupant approaching the premises subsequent to the delivery of the package, a reminder notification may be sent. The reminder notification may include at least one element of a reminder that the package is delivered, information regarding the delivery of the package, and/or an image of the delivered package.

A computing device configured for secure package delivery is also described. The device may include a processor and memory in electronic communication with the processor. The memory may store instructions that may be executable by the processor to receive information regarding a delivery of a package to a premises, detect a delivery person arriving at the premises, and provide instructions to the delivery person regarding how to deliver the package to the designated delivery area within the premises.

A computer-program product for secure package delivery is also described. The computer-program product may include a non-transitory computer-readable medium that stores instructions. The instructions may be executable by the processor to receive information regarding a delivery of a package to a premises, detect a delivery person arriving at the premises, and provide instructions to the delivery person regarding how to deliver the package to the designated delivery area within the premises.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
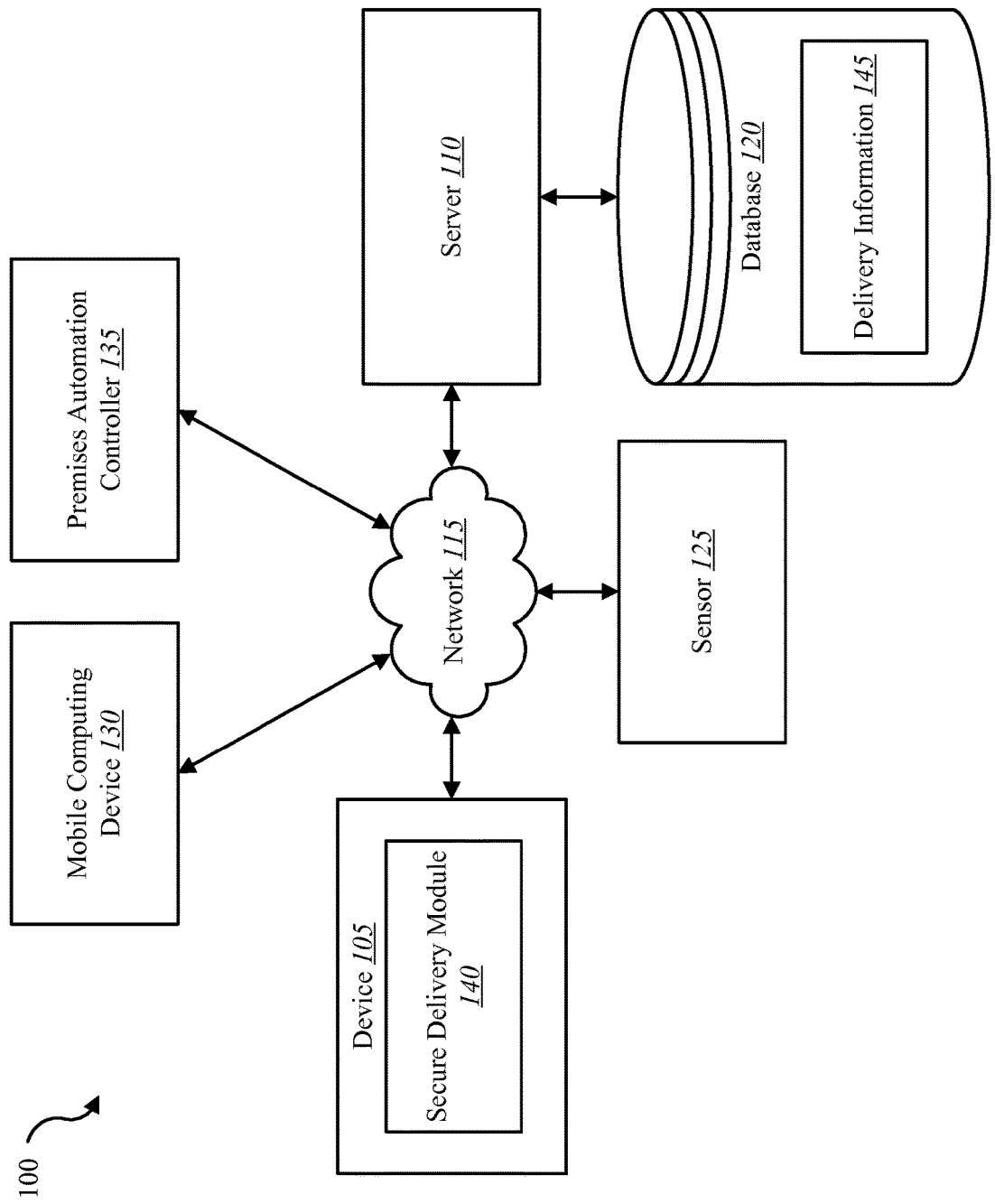
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to premises automation. More specifically, the systems and methods described herein relate to secure delivery of a package to a designated delivery area within a premises. Currently, several drawbacks exist with the current delivery model. For example, the typical delivery to a home or residence includes the delivery person approaching the front door, knocking on the door and/or ringing the doorbell, waiting for an occupant to answer the door, and leaving the package near the doorstep if no one answers the door. In most cases, the delivery person simply knocks on the door and leaves the package on the door step without waiting for someone to answer the door. This delivery model leaves the package vulnerable to theft as the package may be easily visible from the street. Theft of delivered packages from door steps is a significant problem during the holiday season when the number of package deliveries increases dramatically.

Another issue with the current delivery model is that some packages require a signature in order for the delivery person to release custody of the package. In these cases, the delivery person will wait for someone to answer the door after knocking. However, if no one answers the door, the delivery person may leave a note indicating that an attempt was made to deliver the package and that the delivery person will return on a specified day to attempt again to deliver the package. If no one answers the door on the second delivery attempt, the delivery person will leave a note indicating that the recipient may pick up the package at a designated delivery location. This current structure results in additional costs and inconvenience to both delivery companies as well as the recipients of the packages.

Accordingly, the present systems and methods resolve these and other issues by enabling the secure delivery of packages to a designated delivery area within the premises. Even when no one is home or present at a business, a delivery person may be enabled to deliver a package to a designated area of a premises without granting the delivery person full access to the premises. For example, an automated system may grant the delivery person access to a garage area of a premises while ensuring all other access points to the premises area are locked and secure (e.g., ensuring the door from inside the premises to the garage area is locked, etc.). In another example, an automated system may grant the delivery person access to a lobby of a business while ensuring other access points to the business are locked and secure. In addition, the system may monitor the delivery area while the delivery person is delivering the package, capturing one or more photo and/or video images of the delivery area which may be captured and sent to one or more occupants of the premises in real-time to enable the occupant to monitor the delivery in-progress.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, a server 110, a sensor 125, a mobile computing device 130, a premises automation controller 135, and a network 115 that allows the device 105, the server 110, the mobile computing device 130, premises automation controller 135, and sensor 125 to communicate with one another.

Examples of the device 105 may include a remote actuated locking mechanism, a remote actuated garage door controller, a remote actuated gate controller, mobile computing device, smart phone, personal computing device, computer, server, etc.

Examples of the server 110 may include a server administered by a delivery company (e.g., UPS, FedEx, DHL, etc.), a server administered by a premises automation and/or security company, and the like. Accordingly, in some embodiments, environment 100 includes connections to two or more servers (e.g., a connection to a delivery company server and a connection to a premises security company, etc.). Examples of the premises automation controller 135 may include a dedicated premises automation computing device (e.g., wall-mounted controller), a personal computing device (e.g., laptop, desktop, etc.), a mobile computing device (e.g., tablet computing device, smart phone, etc.), and the like.

Examples of sensor 125 include a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, heartbeat sensor, breathing sensor, oxygen sensor, carbon dioxide sensor, brain wave sensor, movement sensor, voice sensor, and the like. Sensor 125 may represent one or more separate sensors or a combination of two or more sensors in a single device. For example, sensor 125 may represent one or more camera sensors and one or more motion sensors connected to environment 100. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105.

Additionally, or alternatively, sensor 125 may be integrated with a home appliance or fixture such as a light bulb fixture. Sensor 125 may include an accelerometer to enable sensor 125 to detect a movement. For example, sensor 125 may be attached to a set of golf clubs in a garage area. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125 attached to an asset. Sensor 125 may include a proximity sensor to enable sensor to detect a proximity of a person relative to an object to which the sensor is attached and/or associated. In some embodiments, sensor 125 may include a forced entry sensor (e.g., shock sensor, glass break sensor, etc.) to enable sensor 125 to detect an attempt to enter an area by force. Sensor 125 may include a siren to emit one or more frequencies of sound (e.g., an alarm).

In some configurations, the device 105 may include a secure delivery module 140. Although the components of the device 105 are depicted as being internal to the device 105, it is understood that one or more of the components may be external to the device 105 and connect to device 105 through wired and/or wireless connections. In some embodiments, an application may be installed on mobile computing device 130, the application enabling a user to interface with a function of device 105, secure delivery module 140, premises automation controller 135, and/or server 110.

In some embodiments, device 105 may communicate with server 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. It is noted that in some embodiments, the device 105 may not include a secure delivery module 140. For example, device 105 may include logic and/or executable instructions that enables device 105 to interface with premises automation controller 135, mobile computing device 130, and/or server 110. In some embodiments, device 105, mobile computing device 130, premises automation controller 135, and server 110 may include a secure delivery module 140 where at least a portion of the functions of secure delivery module 140 are performed separately and/or concurrently on device 105, mobile computing device 130, premises automation controller 135, and/or server 110. Likewise, in some embodiments, a user may access the functions of device 105 and/or premises automation controller 135 (directly or through device 105 via secure delivery module 140) from mobile computing device 130. For example, in some embodiments, mobile computing device 130 includes a mobile application that interfaces with one or more functions of device 105, premises automation controller 135, secure delivery module 140, and/or server 110.

In some embodiments, server 110 may be coupled to database 120. Database 120 may include delivery information 145. For example, device 105 may access delivery information 145 in database 120 over network 115 via server 110. Database 120 may be internal or external to the server 110. In one example, device 105 may be coupled directly to database 120, database 120 being internal or external to device 105.

Secure delivery module 140 may allow a user to control (either directly or via premises automation controller 135), from a subscription-content media set top box, an aspect of the home of the user, including security, locking or unlocking a door, checking the status of a door, locating a person or item, controlling lighting, thermostat, cameras, and the like. Further details regarding the secure delivery module 140 are discussed below.

Figure 2:
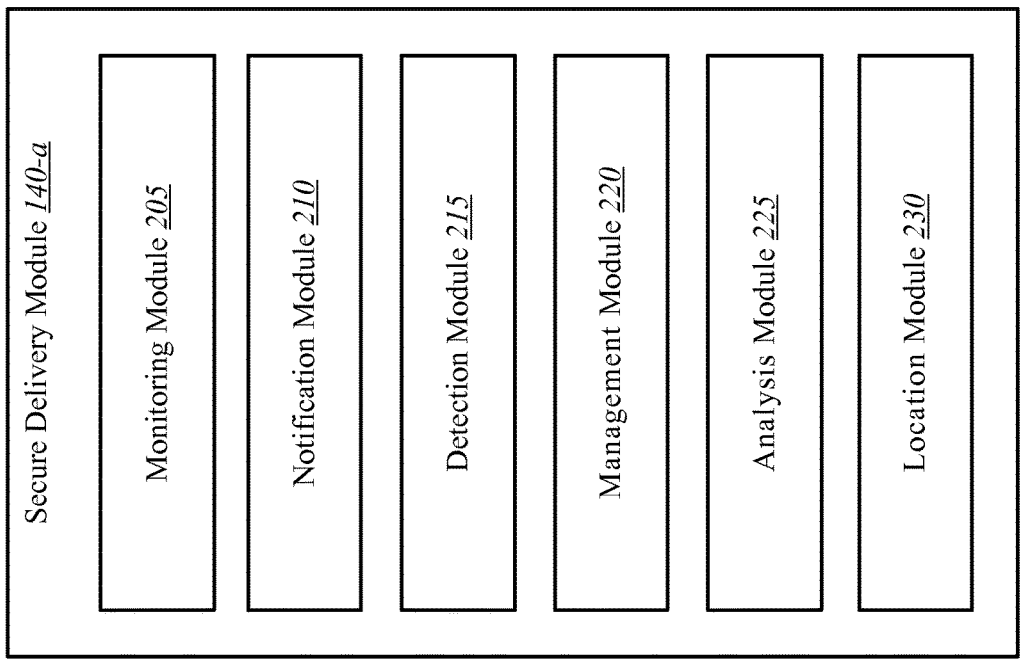
FIG. 2 is a block diagram illustrating one example of a secure delivery module.

FIG. 2 is a block diagram illustrating one example of a secure delivery module 140-*a*. Secure delivery module 140-*a* may be one example of secure delivery module 140 depicted in FIG. 1. As depicted, secure delivery module 140-*a* may include monitoring module 205, notification module 210, a detection module 215, a management module 220, an analysis module 225, and a location module 230.

In one embodiment, monitoring module 205 may receive information regarding a delivery of a package to a premises such as home or business. The information received may include a delivery company name, delivery person information (e.g., delivery person name, photo ID, work ID, etc.), a unique code associated with the company (e.g., barcode, QR code, etc.), a unique code associated with the delivery person, scheduled date of delivery, an expected time of delivery (e.g., a window of time), tracking number, number of packages, weight of each package, dimensions of each package, etc. In some cases, monitoring module 205 may be granted access to a user account associated with a delivery company. Thus, in some cases, monitoring module 205 may query delivery information by accessing the user account, from which monitoring module 205 may receive notices of expected deliveries, real-time updates to the delivery information, real-time notices of a delivery person's arrival at the premises, etc. In some cases, notification module 210 may generate one or more notifications based on the received information regarding a delivery of a package to the premises.

In one example, detection module 215 may detect a delivery person arriving at the premises. In some cases, monitoring module 205 may determine a location of a delivery vehicle. The location of the delivery vehicle may be determined by a location device on the delivery vehicle such as a global positioning system (GPS), the delivery person providing information regarding his or her location (e.g., present delivery location, next delivery location, etc.), and the like. Accordingly, monitoring module 205 may receive information indicating that the delivery vehicle is at and/or within a predefined distance of the premises. Detection module 215 may be configured to recognize a delivery vehicle, a delivery uniform, a delivery company logo, etc. Thus, in some cases, upon receiving information indicating the delivery vehicle is at or near the premises, detection module 215 may scan captured images to detect a delivery vehicle and/or delivery person.

In some cases, the delivery person may ring a doorbell and/or knock on the door of the premises and/or trigger a motion detector. Upon detecting the delivery person at the door, a camera may capture a photo and/or video image of delivery person. The detection module 215 may compare a captured image to an image of the delivery person provided by the delivery company (e.g., a photo ID of the delivery person provided in the information received by the monitoring module 205). In some cases, an automated system (e.g., a prerecorded message, a voice simulated message, etc.) may request that the delivery person stare into the camera in order to capture an image with a similar viewpoint as that of an image of the delivery person provided by the delivery company. Additionally, or alternatively, a delivery person may be instructed to place an identification card in relation to the camera. The identification card may include a photo ID of the delivery person, a delivery person name, a company name, a company logo, a unique code (e.g., barcode, QR code, etc.), short-range communication capabilities (e.g., radio frequency ID (RFID), near-field communication (NFC), etc.), and the like. Upon receiving data from and/or capturing an image of the identification card, the detection module 215 may use any combination of the captured information (e.g., photo ID, name, barcode, RFID, etc.) to verify the identity of the delivery person. In some cases, such as when the delivery person arrives outside an expected period of time, additional verification may be requested.

In some embodiments, before granting the delivery person access to a secure delivery area, the detection module 215 may request the delivery company verify the location of the delivery person. For example, secure delivery module 140-*a* may query a server of the delivery company (e.g., server 110) to determine the current location of the delivery vehicle associated with the expected delivery. Additionally, or alternatively, before granting the delivery person access to a secure delivery area, the detection module 215 may request that the occupant approve granting the delivery person access to the secure delivery location. For example, the occupant may receive a real-time notification regarding the arrival of the delivery person to the premises. Thus, the occupant may receive a live audio and/or photo and/or video image feed of the delivery in progress. In some cases, the occupant may be enabled to communicate with the delivery person in real-time (e.g., between the occupant's mobile computing device and an intercom at the premises over a data network). In some embodiments, the detection module 215 may request that the delivery person enter information associated with the package such as a tracking number and/or an employee identification code. In some cases, the detection module 215 may determine that the information is sent and/or received by a computing machine owned by the delivery company. For example, the system may determine that the information entered by the delivery person is verified and registered by a secure server owned by the delivery company. Upon verifying that the information is entered and verified by the delivery company, temporary access to the secure delivery area may be granted.

In some embodiments, management module 220 may manage the secure delivery of the package once the arrival of an expected delivery is verified (e.g., verifying delivery information, identity of delivery person, etc.). In some cases, management module 220 may provide instructions to the delivery person regarding where to place the delivery at the premises. In some cases, the instructions may be provided to the delivery person upon detecting the delivery person arriving at the premises. For example, the delivery person may knock on the door or ring the doorbell of the premises. Upon detecting the delivery person at the door, a communication device (e.g., a speaker at the door that is part of an intercom system of the premises) may provide instructions to the delivery person. The instructions may include pre-recorded messages, digital text-to-speech messages, and the like. For example, management module 220 play a recorded message from an intercom at the premises, the recorded message including instructions how and where to deliver the package (e.g., how to get a garage door to open, how to get a front door to unlock, where to place inside the garage of the premises, where to place inside the front door, etc.). In some embodiments, management module 220 may provide instructions to the delivery person via a data communication. For example, the delivery person may receive an email, a text message, a radio message (e.g., from a dispatch, etc.), and the like. In some cases, the delivery person may be notified that the process of placing the delivery at the designated delivery location will be recorded.

In some embodiments, the management module 220 may send a temporary access code to a device associated with the delivery person. For example, upon detecting the arrival and/or verifying the identity of the delivery person, the management module 220 may send a temporary access code to a device of the delivery person (e.g., smart phone, tablet computing device, BLUETOOTH® device, etc.). The temporary access code may include a temporary electronic key configured to unlock the front door, a temporary frequency code configured to open the garage door wirelessly, or a temporary keypad code configured to open the garage door via a keypad outside the garage door. The temporary access code may be configured to operate only during a predetermined time period (e.g., based on an expected time of delivery received by the monitoring module 205, etc.), upon detecting the arrival of the delivery person, and/or upon authenticating the identity of the delivery person.

In one embodiment, management module 220 may request an occupant of the premises to select a delivery area and to specify a location within the delivery area where the package is to be placed by the delivery person. The occupant may designate the delivery area by selecting an option presented on a control panel, selecting a location via a smart phone (e.g., mobile computing device 130), speaking a voice command received and interpreted by premises automation controller 135, and the like. In some cases, the occupant may specify the location within the delivery area where the package is to be placed by the delivery person by placing a marker at the specific location. For example, after selecting a garage of the premises as the delivery area, the occupant may place a sign, decal, or other type of indicator on the floor and/or wall of the garage to specify the location of where to place the delivery. Additionally, or alternatively, the occupant may direct a light emitting device (e.g., light emitting diode (LED), LASER, etc.) to shine a light on the specific location of where to place the delivery. For example, the light emitting device may shine a focused beam of light (e.g., similar to a laser pointer) on to the delivery location. The light emitting device may be configured to emit a pattern and/or symbol such as a logo and/or one or more words to indicate the specific location of where to place the delivery. For example, the light emitting device may emit an "arrow" symbol and the words "Place Delivery Here" in relation to the designated location. In some cases, the light emitting device may emit a light of a predetermined color, may flash the light, change the color of the light, etc., to attract the attention of the delivery person. In some embodiments, the light emitting device may be activated upon detecting the delivery person entering the delivery area.

In one embodiment, the management module 220, in conjunction with a camera, may automatically select and designate a delivery area and/or a delivery location within a designated delivery area. For example, upon analyzing one or more areas of the premises, management module 220 may designate a garage of the premises as the delivery area. In some case, management module 220 may select a delivery area configured by the occupant to be the default delivery area. Additionally, or alternatively, management module 220 may store information regarding one or more previous deliveries and analyze the stored information to detect one or more patterns associated with a delivery. Based on the one or more detected patterns, management module 220 may select a delivery area and/or delivery location within the delivery area. Upon determining the delivery area, management module 220 may scan the designated delivery area for one or more available locations within the scanned area where a package may be placed by the delivery person. Based on the scan, the management module 220 may designate a delivery location within the delivery area. In some cases, management module 220 may indicate the designated delivery location with one or more audio and/or visual cues. For example, via a speaker, the management module 220 may instruct the delivery person where to place the package. In some cases, management module 220 may configure a light emitting device to visually indicate the designated delivery location.

In one embodiment, analysis module 225, in conjunction with a camera (e.g., sensor 125), may capture a photo and/or video image of the delivery area. Analysis module 225 may perform image analysis on a captured image to identify the designated delivery location. For example, analysis module 225 may detect a marker placed by the occupant at the designated location. Upon determining the designated location, monitoring module 205, in conjunction with a camera, may be configured to monitor the designated delivery location. In one embodiment, analysis module 225 may analyze the captured image to determine whether access to the designated location is obstructed. For example, a box may be placed in the way of and/or over the designated location, a vehicle may pull into the garage in the way of and/or over the designated location, etc. Upon determining access to the designated location is obstructed by another object, notification module 210 may generate a notification comprising information regarding the detected obstruction.

In one embodiment, location module 230 may determine a location and/or heading of an occupant of the premises. For example, location module 230 may determine a distance between the premises and the occupant, a heading of the occupant, and the like. Based on the location and heading of the occupant in relation to previously detected patterns, location module 230 may determine that the occupant is at the premises, heading away from the premises, heading to the premises, etc. Upon determining the location of the occupant is beyond a predefined distance of the premises, management module 205 may automatically select a type of delivery. The type of delivery may specify a delivery location within a delivery area at the premises where the package is to be placed by the delivery person. In some cases, upon determining the location of the occupant is within a predefined distance of the premises, management module 205 may request the occupant select a type of delivery.

In one embodiment, upon verifying the identity of the delivery person, management module 205 may grant the delivery person access to the delivery area. For example, management module 205 may grant the delivery person access to a garage space by actuating a garage door opener or grant access to an entry way of the premises by actuating a door locking mechanism on an exterior door of the premises. Additionally, or alternatively, upon verifying that at least one monitored locking mechanism of the premises is in a locked position, management module 205 may grant the delivery person access to the delivery area. In some cases, upon granting access to the delivery person, management module 205, in conjunction with a camera, may capture one or more photo and/or video images of the delivery person in the delivery area while the delivery person places the package at the designated location. In some cases, management module 205 may send in real-time one or more captured images of the delivery in-progress to the occupant. Thus, the occupant may monitor the delivery in real-time. In some cases, the management module 205 may enable the occupant to communicate with the delivery person in real-time while the delivery person delivers the package.

In some cases, detection module 215 may determine where the delivery person places the package inside the delivery area. Upon determining where the delivery person places the package inside the delivery area, analysis module 225 may determine whether a difference between the designated delivery location and the actual location where the package is delivered satisfies a predetermined threshold. Upon determining the difference between the designated delivery location and the actual location where the package is delivered satisfies a predetermined threshold, management module 220 may prompt the delivery person to adjust the location of the package placement. For example, management module 205 may provide an audio feedback (e.g., play a recorded voice instruction, digitally communicate a text-to-speech instruction, etc.), visual feedback (e.g., a flashing light, a certain color of light). In some cases, management module may provide a continuous visual feedback while the delivery person is delivering the package. For example, upon entering the delivery location, a light emitting device may shine a red light on a surface of the delivery area until the package is placed within a predetermined distance of the designated delivery location. Upon detecting the delivery person placing the package within the predetermined distance of the designated delivery location, the light emitting device may switch from emitting the red light to a green light. Additionally, or alternatively, audio feedback may indicate proper placement of the package at the designated delivery location.

In one embodiment, upon determining the package is delivered securely (e.g., the package is in place, the delivery person has exited the delivery area, the delivery area is secured), notification module 210 may send a delivery notification to the occupant. The delivery notification may include at least one element of information regarding the delivery of the package, one or more photo and/or video images of the delivered package, and/or a system security overview. The system security overview may include graphical symbols and one or more word descriptions regarding the security of the premises (e.g., a green light symbol next to "front door," a green light symbol next to "garage door," a green light symbol next to "back door," etc.).

In one embodiment, upon detecting the occupant approaching the premises subsequent to the delivery of the package, notification module 210 may generate and send a reminder notification. The reminder notification may include at least one element of a reminder that the package is delivered, information regarding the delivery of the package, and one or more photo and/or video images of the delivered package. In some cases, analysis module 225, in conjunction with a camera, may analyze the location of the delivered package in relation to a location of vehicle parking spot inside the garage. For example, secure delivery module 140-a may detect one or more patterns and learn when and where a vehicle typically parks inside the garage. For example, analysis module 225 may determine the probability of a vehicle detected as approaching the premises of being parked in a certain location within the garage. Based on the learned parking pattern, analysis module 225 may perform a collision risk analysis when detection module 215 detects an approaching vehicle, determining the likelihood of a vehicle entering the garage and colliding with the delivered package. Upon detecting the likelihood of a collision satisfies a predetermined threshold, notification module 210 may generate and send a warning notification indicating a potential collision.

Figure 3:
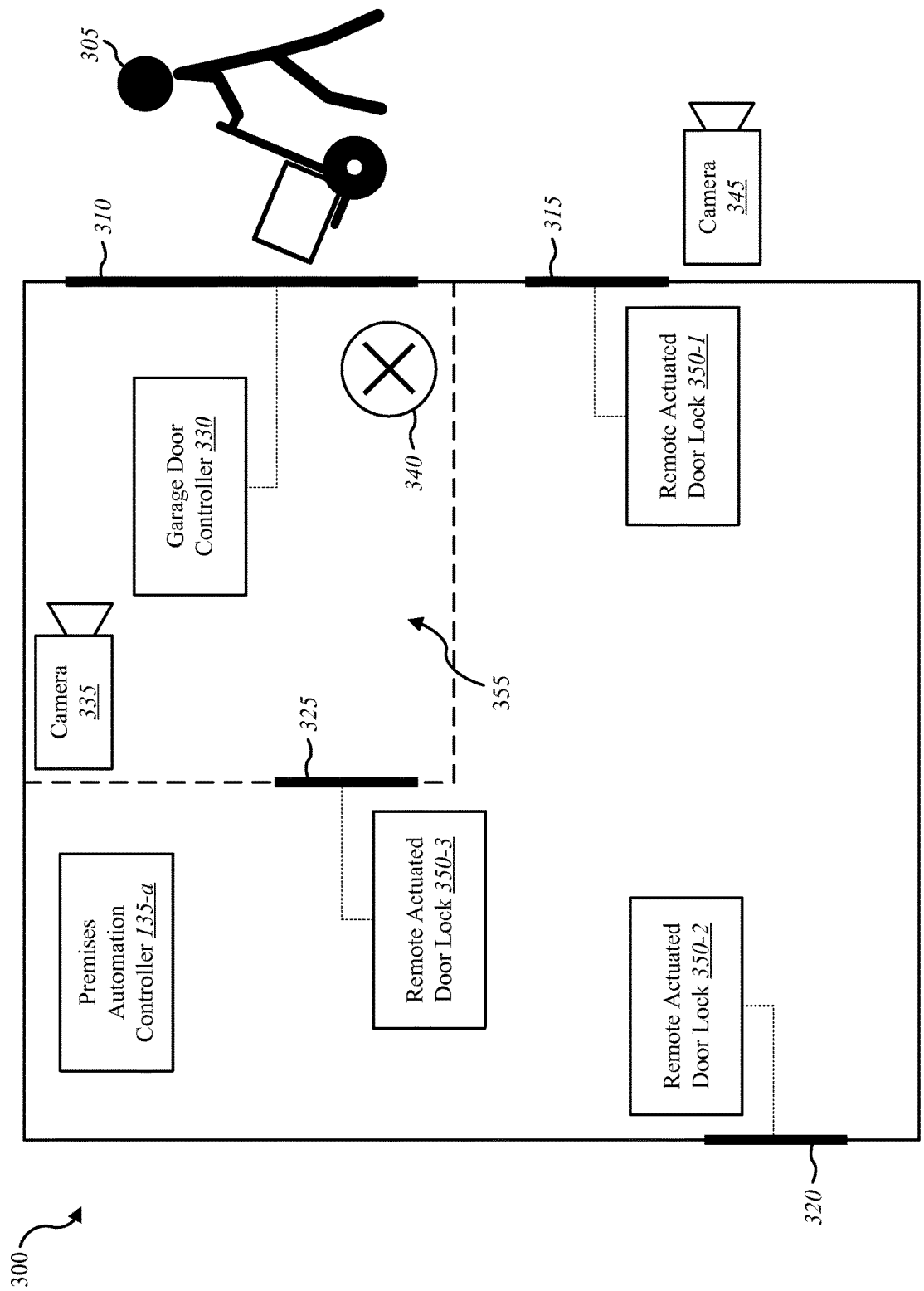
FIG. 3 is a block diagram illustrating one example of a premises for enabling the secure delivery of a package to the premises.

FIG. 3 is a block diagram illustrating one example of a premises 300 for the secure delivery of packages to the premises 300. As depicted, a delivery person 305 may be charged to deliver a package to the premises 300. The premises 300 may include one or more points of entry to control access to certain areas of the premises 300. For example, premises 300 may include a garage door 310, a front door 315, a back door 320, and a door to the garage 325 situated between an interior area of the premises 300 and the garage 355. In some cases premises 300 may include one or more cameras such as camera 335 situated in relation to an area of the garage 355 and/or camera 345 situated in relation to the front door 315. Premises 300 may include a premises automation controller 135-a, which may be one example of premises automation controller 135 of FIG. 1.

In one embodiment, the premises automation controller 135-a, in conjunction with the secure delivery module 140, may detect an arrival of delivery person 305 to premises 300. For example, premises automation controller 135-a may analyze an image captured by camera 345 to determine that the delivery person is at the premises 300. In some cases, camera 345 may capture one or more photo and/or video images in order to verify delivery information such an identity of the delivery person 305, a barcode, etc. Upon verifying the delivery person 305, premises automation controller 135-a may grant the delivery person 305 access to a designated delivery area. In one example, premises automation controller 135-a may send a command to a garage door controller 330 to open the garage door 310. In some cases, before granting access to the delivery person 305, premises automation controller 135-a may verify that one or more locking mechanisms associated with one or more entry ways of premises 300 are in a locking position. For example, before granting access to the delivery person, premises automation controller 135-a may verify that remote actuated door lock 350-1 of front door 315, remote actuated door lock 350-2 of back door 320, and/or remote actuated door lock 350-3 of the door to the garage 325 are in a locked position. In one example, an exterior wall of the garage 355 may include a man door or pass door, a hinged door that provides an additional access point to the garage 355 from outside the premises 300. Thus, in some cases, the delivery person may be granted access to the garage 355 by unlocking a man door or pass door on garage 355.

In some cases, premises automation controller 135-a may grant access to the delivery person 305 by verifying a temporary access code delivered to a device of the delivery person 305. For example, premises automation controller 135-a may send a temporary access code to a smart phone of the delivery person. Upon arriving, premises automation controller 135-a may detect a device of the delivery person transmitting the temporary access code, and upon verifying the temporary access code, grant the delivery person 305 access to the designated delivery area. In the depicted example, premises automation controller 135-a may grant delivery person 305 access to the garage 355 via garage door 310. Upon entering the garage, the delivery person may be enabled to determine where to place the package by observing an indicator 340 of the designated delivery location. In some cases, the designated delivery location may be marked by one or more signs affixed to a surface of the garage 355 (e.g., a wall and/or floor of the garage 355). In some cases, the designated delivery location may be indicated by one or more light emitting devices.

Accordingly, the delivery person 305 may exit the delivery area (e.g., garage 355) after placing the package at the delivery location designated by the indicator 340. After detecting the delivery person 305 placing the delivery at the designated delivery location and the delivery person 305 exiting the garage 355, premises automation controller 135-a may send a command to garage door controller 330 to close the garage door 310. In some cases, premises automation controller 135-a may then send a delivery notification to an occupant of premises 300, whether the occupant is at the premises or away. Although the depicted example is described using premises automation controller 135-a, in some cases one or more described functions may be integrated within garage door controller 330, camera 335, camera 345, and/or remote actuated door locks 350-1, 350-2, and 350-3, any one or combination of which may perform one or more of the above-described functions with or without the premises automation controller 135-a.

Figure 4:
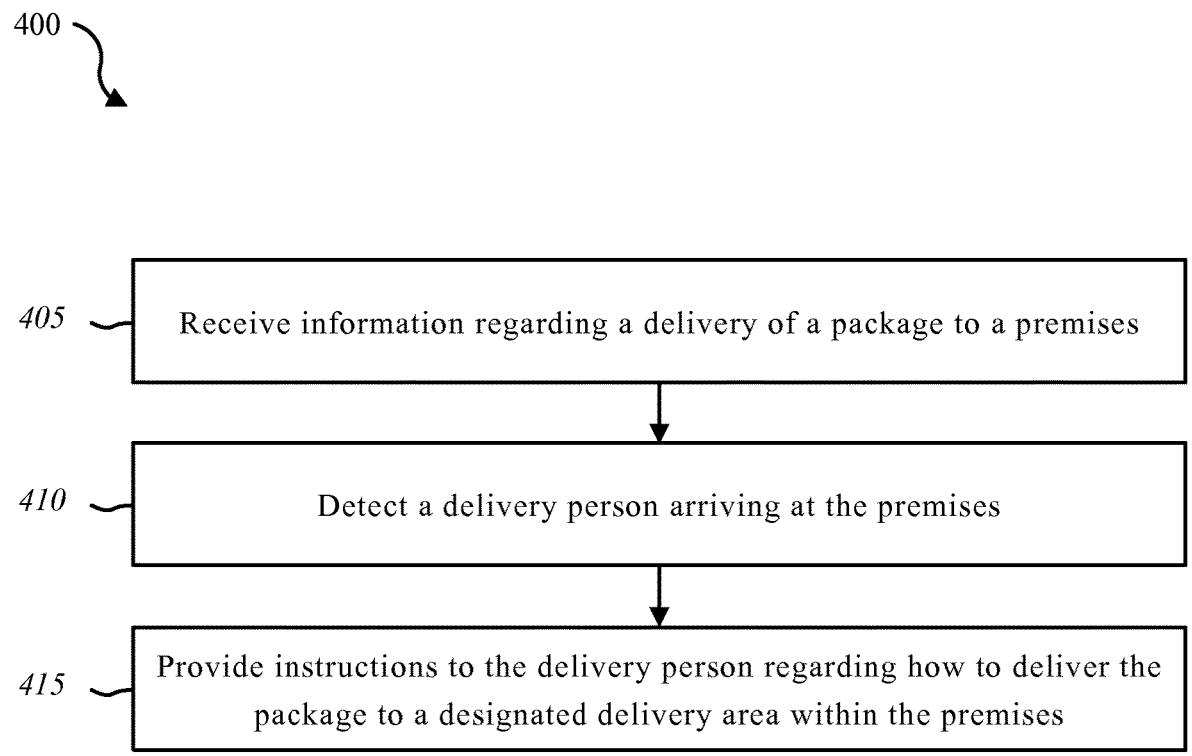
FIG. 4 is a flow diagram illustrating one embodiment of a method for secure package delivery.

In one embodiment, detection module 215, via one or more sensors, may detect a temperature of the delivery area. Additionally, or alternatively, detection module 215 may detect a temperature in association with the one or more items being delivered. For instance, detection module 215 may detect a temperature of a garage area, the temperature of a refrigeration unit (e.g., an ice box, a cooler, a freezer, a fridge, etc.), and/or the temperature of the delivered item. Thus, if an item being delivered were to include perishable items such as food, the notification module 210 may be configured to instruct the delivery person to place the item in a refrigeration unit located at the premises. In some cases, management module 220 may associate a timestamp on the one or more items being delivered, enabling the notification module 210 to notify an occupant of the premises how long a delivered item has been located on the designated delivery location. In some cases, detection module 215 may detect adverse conditions for a delivered item in association with the location where the item was delivered. For example, if conditions of the delivery location change and/or the delivery person does not delivery the item to the proper location (e.g., a refrigeration unit), then notification module 210 may send an alert. For instance, notification module 210 may send an alert if an item remains exposed in a detected adverse condition beyond a predetermined time period. One or more photo and/or video images may be analyzed by analysis module 225 to indicate when a delivered item is removed from the designated delivery location such as being brought inside a premises FIG. 4 a flow diagram illustrating one embodiment of a method 400 for secure package delivery. In some configurations, the method 500 may be implemented by the secure delivery module 140 illustrated in FIG. 1 or 2. In some configurations, the method 500 may be implemented in conjunction with an application and/or the user interface associated with one or more devices depicted in FIG. 1.

At block 405, information regarding a delivery of a package to a premises may be received. At block 410, a delivery person arriving at the premises may be detected. At block 415, instructions may be provided to the delivery person regarding how to deliver the package to the designated delivery area within the premises. Additionally, or alternatively, instructions may be provided to the delivery person of how to gain access to a specified delivery area of the premises.

Figure 5:
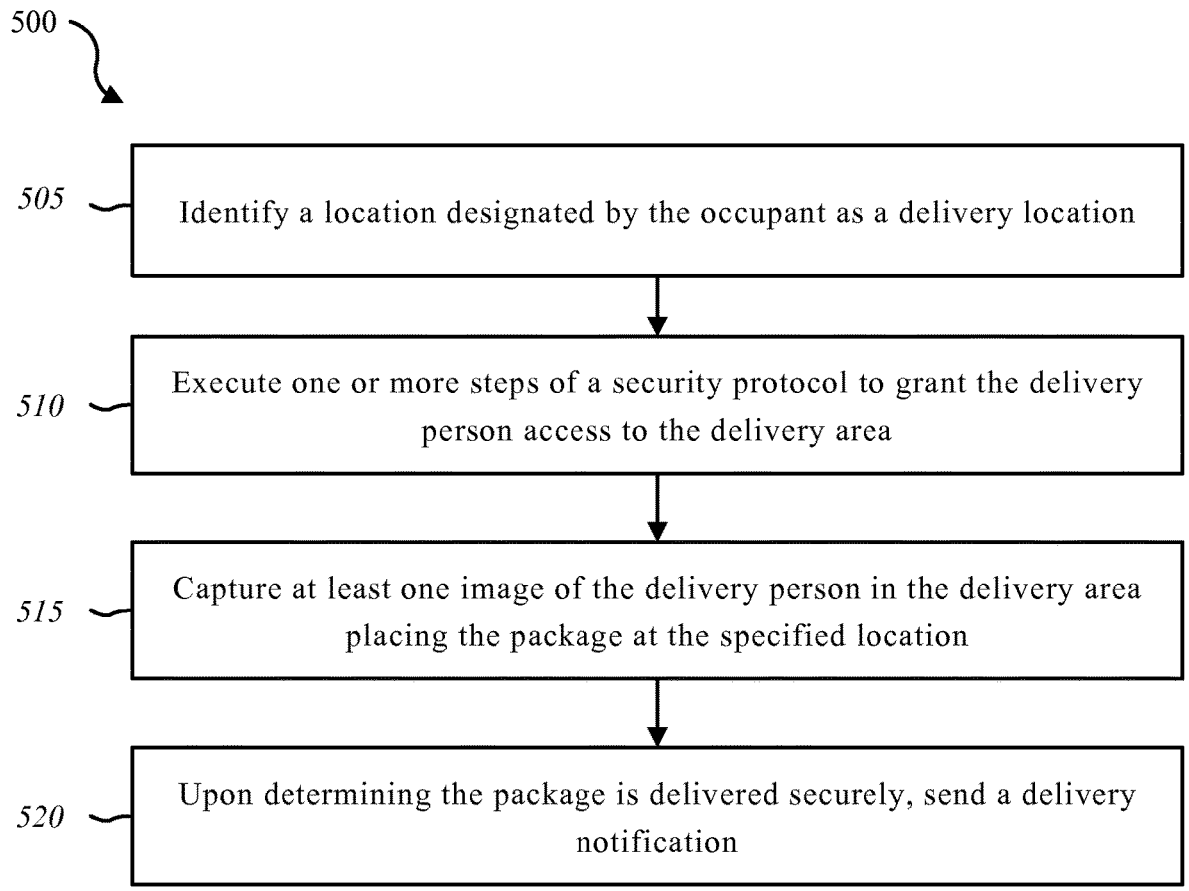
FIG. 5 is a flow diagram illustrating one embodiment of a method for granting a delivery person access to a designated delivery area of a premises.

FIG. 5 is a flow diagram illustrating one embodiment of a method 500 for granting a delivery person access to a designated delivery area of a premises. In some configurations, the method 500 may be implemented by the secure delivery module 140 illustrated in FIG. 1 or 2. In some configurations, the method 500 may be implemented in conjunction with an application and/or the user interface associated with one or more devices depicted in FIG. 1.

At block 505, a location designated by the occupant as a delivery location may be identified. In some embodiments, an occupant of the premises may be requested to select a delivery area and to specify a location within the delivery area where the package is to be placed by the delivery person. In some cases, one or more photo and/or video images of the delivery area may be captured. Image analysis may be performed on the captured image to identify the designated location. For example, a marker placed at the designated location by the occupant may be detected. At block 510, one or more steps of a security protocol may be executed before granting the delivery person access to the delivery area. In some embodiments, the arrival of the delivery person to the premises may be detected. It may be determined whether the delivery person arrives within a predetermined period of time in relation to a specified delivery time. In some cases, upon verifying the identity of the delivery person and/or upon verifying that at least one monitored locking mechanism of the premises is in a locked position, the delivery person may be granted access to the delivery area. In some cases, a temporary access code supplied by the delivery person and/or transmitted by a device associated with the delivery person may be verified. At block 515, at least one image may be captured of the delivery person in the delivery area placing the package at the designated location. At block 520, upon determining the package is delivered securely, a delivery notification may be sent. The delivery notification may include at least one element of information regarding the delivery of the package, an image of the delivered package, and/or a system security overview.

Figure 6:
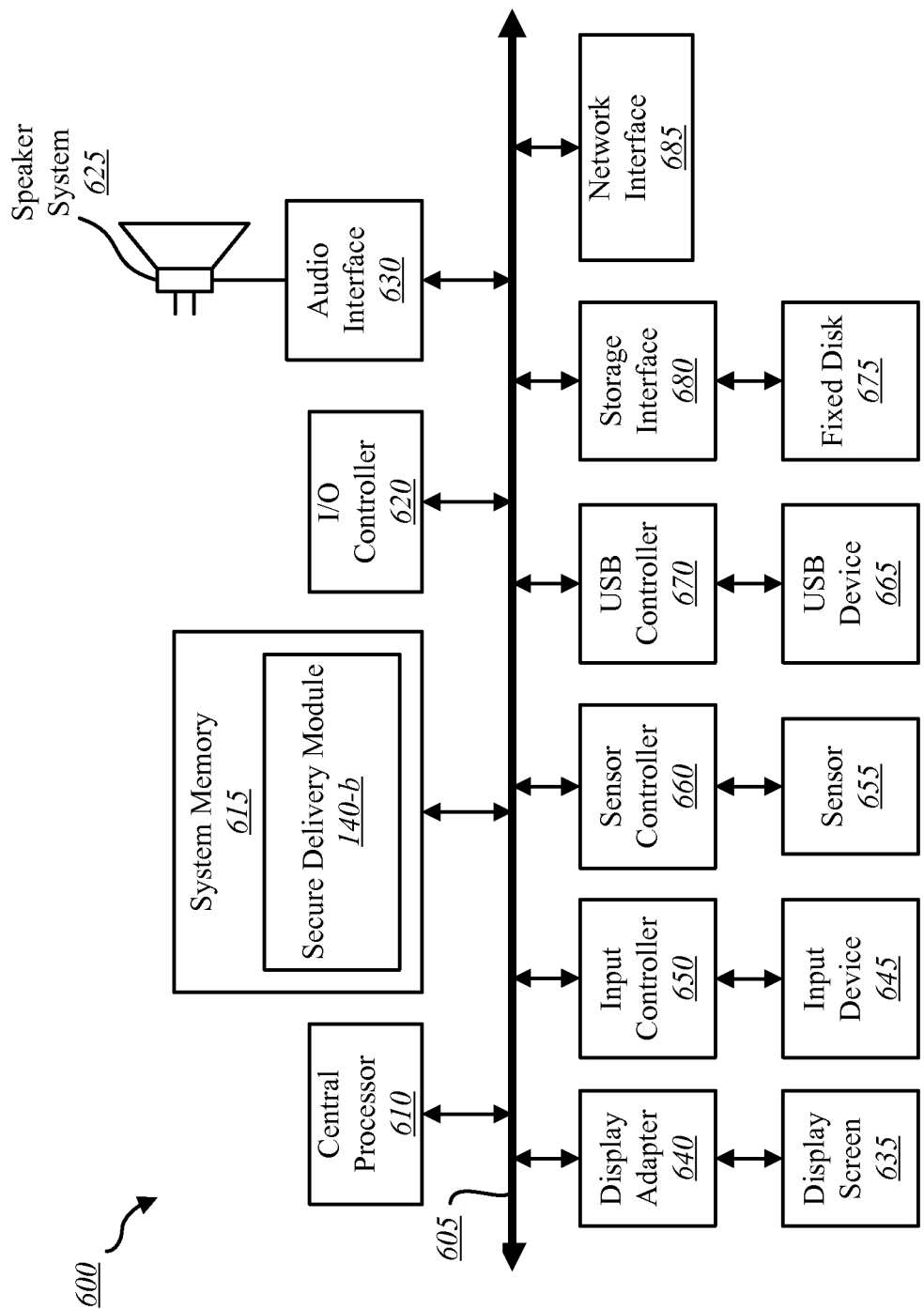
FIG. 6 depicts a block diagram of a computer system suitable for implementing the present systems and methods.

FIG. 6 depicts a block diagram of a controller 600 suitable for implementing the present systems and methods. The controller 600 may be an example of the set top box device 105, computing device 150, and/or home automation controller 155 illustrated in FIG. 1. In one configuration, controller 600 includes a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the secure delivery module 140-b to implement the present systems and methods may be stored within the system memory 615. Applications resident with controller 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of controller 600, can connect to a standard computer readable medium for storage and/or retrieval of information, such as a fixed disk drive 675. Fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for enabling secure delivery of a package to a delivery area, comprising:
   receiving, via one or more processors, information regarding a delivery of the package to a premises;
   detecting, via the one or more processors, a pattern associated with the delivery of the package, wherein the pattern is based at least in part on one or more previous deliveries;
   determining a location of an occupant of the premises and whether the occupant is beyond a predefined distance from the premises;
   selecting, via the one or more processors, the delivery area within the premises based at least in part on the detected pattern and the location of the occupant;
   detecting, via the one or more processors, a delivery person arriving at the premises by a delivery vehicle associated with a delivery company;
   receiving, via the one or more processors, information relating to an identity of the delivery person including at least the delivery company;
   querying an external server of the delivery company to determine a location of the delivery vehicle and authenticate a location of the delivery person based at least in part on determining the location of the delivery vehicle;
   in response to authenticating the location of the delivery person, wirelessly actuating unlocking, via the one or more processors, of the selected delivery area within the premises and verifying, via the one or more processors, that a remaining area within the premises is locked; and
   providing instructions to the delivery person regarding how to deliver the package to the selected delivery area within the premises.

2. The method of claim 1, further comprising:
   upon authenticating the location of the delivery person, granting the delivery person access to the delivery area.

3. The method of claim 1, further comprising:
   upon verifying that at least one monitored lock of the premises is in a locked position, granting the delivery person access to the delivery area.

4. The method of claim 1, further comprising:
   capturing at least one image of the delivery person placing the package in the delivery area.

5. The method of claim 1, further comprising:
   capturing an image of the delivery area; and
   performing image analysis on the captured image to identify a designated delivery location within the delivery area by detecting an indicator of the designated delivery location.

6. The method of claim 5, further comprising:
   analyzing the captured image to detect whether access to the designated delivery location is obstructed; and
   upon detecting access to the designated delivery location is obstructed, generating a notification comprising information regarding the detected obstruction.

7. The method of claim 1, further comprising:
   requesting the occupant of the premises to select the delivery area and to specify a location within the delivery area where the package is to be placed by the delivery person.

8. The method of claim 1, further comprising:
   upon determining the location of the occupant is beyond the predefined distance of the premises, automatically selecting a type of delivery, the type of delivery specifying a location at the premises where the package is to be placed by the delivery person.

9. The method of claim 8, further comprising:
   upon determining the location of the occupant is within the predefined distance of the premises, requesting the occupant to select the type of delivery.

10. The method of claim 1, further comprising:
    upon determining the package is delivered securely, sending a delivery notification, wherein the delivery notification comprises at least one of information regarding the delivery of the package, an image of the delivered package, and a system security overview.

11. The method of claim 1, further comprising:
    upon detecting the occupant approaching the premises subsequent to the delivery of the package, sending a reminder notification, the reminder notification comprising at least one of a reminder that the package is delivered, information regarding the delivery of the package, and an image of the delivered package.

12. A computing device configured for enabling secure delivery of a package to a delivery area, comprising:
    a processor;
    memory in electronic communication with the processor; and
    instructions stored in the memory, the instructions being executable by the processor to:
      receive information regarding a delivery of the package to a premises;
      detect a pattern associated with the delivery of the package, wherein the pattern is based at least in part on one or more previous deliveries;
      determine a location of an occupant of the premises and whether the occupant is beyond a predefined distance from the premises;
      select the delivery area within the premises based at least in part on the detected pattern and the location of the occupant;
      detect a delivery person arriving at the premises by a delivery vehicle associated with a delivery company;

receive information relating to an identity of the delivery person including at least the delivery company;

query an external server of the delivery company to determine a location of the delivery vehicle and authenticate a location of the delivery person based at least in part on determining the location of the delivery vehicle;

upon authenticating the location of the delivery person, wirelessly actuate unlocking of the selected delivery area within the premises and verify that a remaining area within the premises is locked; and provide instructions to the delivery person regarding how to deliver the package to the selected delivery area within the premises.

13. The computing device of claim 12, wherein the instructions are executable by the processor to:

upon authenticating the location of the delivery person, grant the delivery person access to the delivery area.

14. The computing device of claim 13, wherein the instructions are executable by the processor to:

upon verifying that at least one monitored lock of the premises is in a locked position, grant the delivery person access to the delivery area.

15. The computing device of claim 12, wherein the instructions are executable by the processor to:

capture at least one image of the delivery person placing the package in the delivery area.

16. The computing device of claim 12, wherein the instructions are executable by the processor to:

perform image analysis on an image of the delivery area to identify a designated delivery location within the delivery area by detecting an indicator of the designated delivery location.

17. The computing device of claim 16, wherein the instructions are executable by the processor to:

analyze the image of the delivery area to detect whether access to the designated delivery location is obstructed; and upon detecting access to the designated delivery location is obstructed, generate a notification comprising information regarding the detected obstruction.

18. The computing device of claim 12, wherein the instructions are executable by the processor to:

upon determining the location of the occupant is beyond the predefined distance of the premises, automatically select a type of delivery, the type of delivery specifying a location at the premises where the package is to be placed by the delivery person.

19. A computer-program product for enabling, by a processor, secure delivery of a package to a delivery area, the computer-program product comprising a non-transitory computer-readable medium storing instructions thereon, the instructions being executable by the processor to:

receive information regarding a delivery of the package to a premises;

detect a pattern associated with the delivery of the package, wherein the pattern is based at least in part on one or more previous deliveries;

determine a location of an occupant of the premises and whether the occupant is beyond a predefined distance from the premises;

select the delivery area within the premises based at least in part on the detected pattern and the location of the occupant;

detect a delivery person arriving at the premises by a delivery vehicle associated with a delivery company;

receive information relating to an identity of the delivery person including at least the delivery company;

query an external server of the delivery company to determine a location of the delivery vehicle and authenticate a location of the delivery person based at least in part on determining the location of the delivery vehicle;

upon authenticating the location of the delivery person, wirelessly actuate unlocking of the selected delivery area within the premises and verify that a remaining area within the premises is locked; and provide instructions to the delivery person regarding how to deliver the package to the selected delivery area within the premises.

20. The computer-program product of claim 19, wherein the instructions are executable by the processor to:

upon authenticating the location of the delivery person, grant the delivery person access to the delivery area.

* * * * *